Dec. 1, 1953    K. EISENBURGER    2,661,416
WELDING HEAD FOR SIMULTANEOUSLY EFFECTING A SERIES
OF SPOT WELDS ACCORDING TO THE DOUBLE SPOT METHOD
Filed Jan. 7, 1952    2 Sheets-Sheet 1
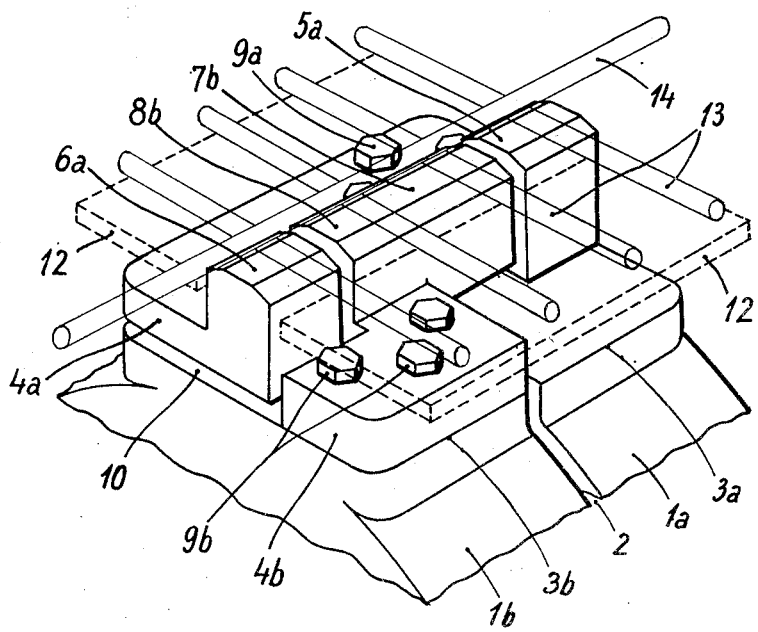
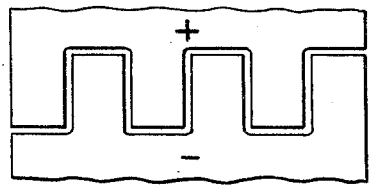
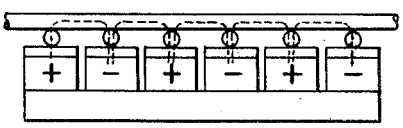
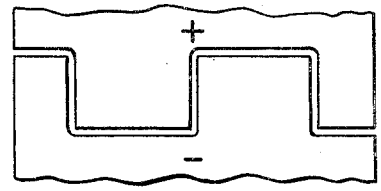
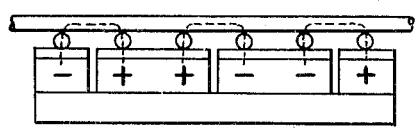
INVENTOR
Kuno Eisenburger
BY Watson, Cole, Grindle & Watson
ATTORNEYS

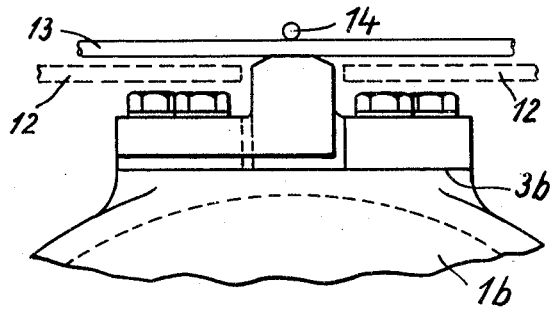
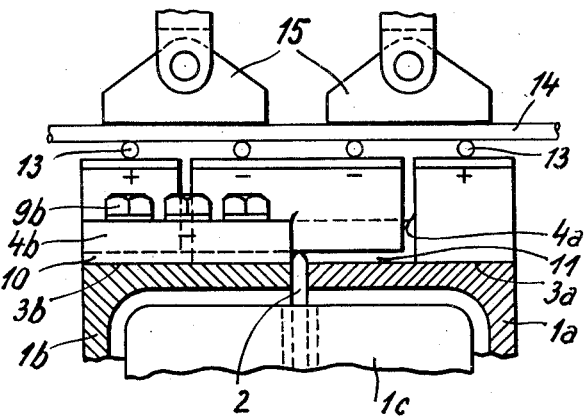
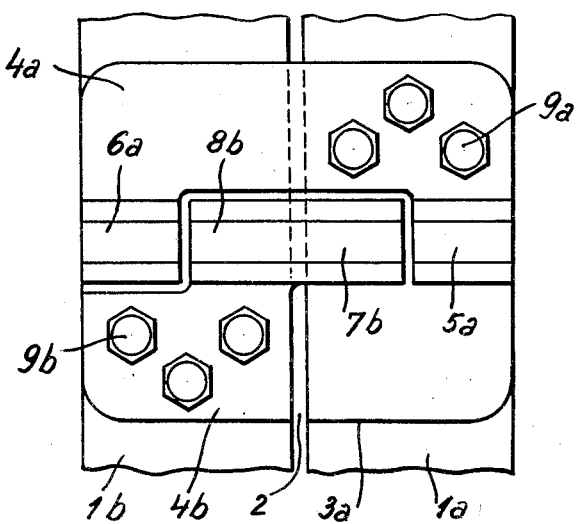

Patented Dec. 1, 1953

2,661,416

UNITED STATES PATENT OFFICE 2,661,416

WELDING HEAD FOR SIMULTANEOUSLY EFFECTING A SERIES OF SPOT WELDS ACCORDING TO THE DOUBLE SPOT METHOD

Kuno Eisenburger, Wels, Austria, assignor to EVG Entwicklungs- und Verwertungsgesellschaft m. b. H., Graz, Styria, Austria Application January 7, 1952, Serial No. 265,344

Claims priority, application Austria January 18, 1951

4 Claims. (Cl. 219—4)

The invention relates to a welding appliance, and more particularly to the weld head thereof, for performing spot welding operations according to the double spot method wherein both electrodes are arranged on the same side of the metal articles to be welded together, the welding current passing from one electrode through one of the metal articles and one spot of weld into the other metal article, along said article to the second spot of weld, and from there out into the first named article or a third one and finally into the electrode of opposite polarity.

This double spot method has proved advantageous particularly for the welding of grids or netting of wire, because in this case troublesome shunt currents which may occur in metal sheets when welding them together by the double spot method can be largely obviated by appropriate connection of the crossed bars or wires.

The double spot method allows also to reduce the distance between the spots of weld by connecting adjacent electrodes in parallel whereby an insulating gap between such electrodes, the same being of equal polarity, can be dispensed with.

It is a main object of the invention to provide a simple and compact welding appliance for effecting a series of welds according to the double spot method simultaneously in one operation.

It is another object of the invention to provide a simple and compact weld head for effecting a series of welds closely adjacent to one another according to the double spot method simultaneously in one operation.

It is yet another object of the invention to provide a welding appliance allowing a direct connection of the current source to the welding electrodes, dispensing with cumbersome leads and with the conduction and transition losses involved by them.

It is still another object of the invention to provide a simple and compact welding appliance wherein several pairs of electrodes are supplied by a common source of welding current in parallel, dispensing with the necessity of using separate current sources for each pair and with cumbersome conductors from such source to the electrodes.

It is a further object of the invention to provide a weld head allowing the quick exchange of electrodes of a set of electrodes for effecting different numbers of spots of welds arranged at different distances within the range of the same weld head.

With these and other objects in view, I arrange a weld head for simultaneously effecting a series of spot welds according to the double spot method generally in such a manner that it comprises in combination: at least two pairs of weld electrodes, two electrode holders each holder being integral with at least one pair of the said weld electrodes, the said electrodes forming projections of the said holders intermeshing with one another gear teeth-fashion with an insulating gap left free between adjacent electrodes of different polarity.

In a preferred form of the weld head according to the invention, the same comprises in combination: at least two plate shaped electrode holders arranged side by side substantially in a common plane, projections arranged on the edges of the said plates facing one another, the said projections projecting beyond the plane of the said plate shaped holders and intermeshing with one another gear teeth-fashion with an insulating gap left free between adjacent projections, the said projections serving as weld electrodes.

In order that the invention may be better understood and readily carried into effect, some embodiments thereof will now be described by way of example with reference to the accompanying drawings, in which:

Fig. 1 is a perspective view,

Fig. 2 is a part end elevation,

Fig. 3 is a part side elevation partly in section, and

Fig. 4 is a plan view from above of a weld head according to the invention and of the adjacent portions of the welding appliance.

Fig. 5a is a plan view, and

Fig. 5b a side elevation of a modified weld head, on a smaller scale and simplified diagrammatically.

Fig. 6a is a plan view, and

Fig. 6b is a side elevation of another modification of a weld head, on the same reduced scale and in the same simplified diagrammatic representation as Figs. 5a and 5b.

In Figs. 1 to 4 of the drawing it is assumed that an annular core transformer having a casing serving as a secondary conductor is used as a source of the welding current. The two halves $1a$ and $1b$ of the transformer casing, which are separated from one another by an insulating gap $2$, are provided with flange-like butt faces $3a$ and $3b$, serving for the attachment of the weld head. The primary coil with the annular core is indicated in Fig. 3 by the component $1c$. The weld head consists of the two electrode holders $4a$ and $4b$, each of which has projections acting as electrodes, made in one piece with the holder. The electrode holders themselves are constructed plate-shaped, and are screwed fast by means of the screws 9a, 9b, respectively, on the flange-like butt faces 3a and 3b, respectively, of the casing.

The electrode holder 4a which carries the two side electrodes 5a and 6a extends also over the flange-like extension 3b of the casing, but is stepped at its lower surface within the range of this extension in such a manner that it leaves an insulating gap 10 free between itself and this flange. The electrode-holder 4b carries the two middle electrodes 7b and 8b which are combined into a double electrode, of which the latter extends partly over the flange 3a of the casing and for this reason is likewise stepped at its underside, in order to leave an insulating gap 11 free between itself and this flange.

The plate-shaped electrode holders 4a and 4b lie, as seen from above (Fig. 4) at opposite sides of the welding stretches and extend unweakened up to the electrodes so that the current from the transformer casing which acts as the secondary conductor is supplied to the electrodes practically without conduction loss. At the edges of the plates facing one another the projections 5a, 6a and 7b, 8b, respectively, are provided which project beyond the plane of the plates and intermesh with one another gear-fashion in the plane of the plates, the said projections acting as electrodes. The cross section of the electrodes may have, say, the roof-shaped form as shown in Figs. 1 and 2.

The weld head is conveniently covered on the top by a plate 12 of insulating material, e. g. of artificial plastics so that the electrode ends only project from a slot of the plate.

For the welding of wire grids the lower wires 13 (longitudinal wires) are directed over the electrodes, according to Figs. 1 and 2 perpendicularly to the welding stretches whereas the upper wires 14 (transverse wires) run parallel to the stretches and electrodes. In order to ensure a uniform welding pressure, the double spot welding stretches between the cooperating electrodes 5a, 7b and 6a, 8b, respectively, are bridged in a manner known per se by pressure punches 15 moving up and down, which punches are preferably pivoted, in order to effect a compensation of pressure differences when there are small variations in the wire gauge. The pressure punches 15 are moreover made preferably of highly conductive material, e. g. of copper, so that they form, as a bridge for the current, a shunt to the adjacent parts of the transverse wires 14, and reduce the undesirable losses in the latter. The current accordingly flows from the electrode 5a across the adjacent longitudinal wire 13 into the transverse wire 14, then from the latter predominantly via the current bridge 15 to the next longitudinal wire 13, and finally to the electrode 7b.

The construction of the electrode-holder can, within the scope of the invention, be made also in accordance with Figs. 5a and b in such a manner that electrodes of different polarity alternate with one another in the manner of intermeshing gear teeth. Then the current would pass from the inner electrodes on both sides to the adjacent electrodes, whereas the outer electrodes would have one adjacent opposite electrode only, and would accordingly carry a weaker welding current. In order to supply all points of weld with the same current intensity, it is convenient to make the arrangement of the electrodes in accordance with the aforesaid older proposal in such a manner, that pairs of adjacent inner electrodes of the weld head have the same polarity, so that the successive double spot welding stretches are separated from one another by current-free intervals and carry currents which are directed in opposite direction such as assumed in Figs. 1 to 4. Figs. 6a and 6b show another embodiment of a weld head according to the invention constructed in accordance with this principle, which gives the same number of spots of weld as the embodiment according to Figs. 5a and 5b.

When the electrode holders according to the Figs. 1 to 4 and 6 are made of equal width and when the same disposition of attachment means (screws 9a and 9b) is used, the weld heads can easily be exchanged in order to change over from four spots of weld along the width of the weld head (Figs. 1 to 4) to six (Fig. 6).

By the use of exchangeable weld heads suitably graded as regards the number of electrodes, the distance between the spots of weld can be varied in a simple manner according to requirements. A length of the row of spots of weld extending beyond the width of the weld head can be attained in a known manner by arranging several weld heads side by side with separate sources of welding current. The arrangement illustrated in Figs. 1 to 4 of the welding electrodes on annular core transformers allows a particularly compact assembly of several units.

While I have described and illustrated what may be considered typical and useful embodiments of my said invention, I wish it to be understood that I do not limit myself to the details and dimensions shown and described, for obvious modifications will occur to a person skilled in the art in accordance with the special conditions in which my said invention is to be applied.

What I claim as my invention and desire to secure by Letters Patent, is:

1. A weld head for simultaneously effecting a series of spot welds according to the double spot method, comprising in combination: at least two plate shaped electrode holders arranged side by side substantially in a common plane, projections arranged on the edges of the said plates facing one another, the said projections projecting beyond the plane of the said plate-shaped holders and intermeshing with one another gear teeth-fashion along the welding line, with an insulating gap left free between adjacent projections, the said projections serving as weld electrodes.

2. A weld head for simultaneously effecting a series of spot welds according to the double spot method, comprising in combination: at least two plate-shaped electrode holders arranged side by side substantially in a common plane, projections of a predetermined length and projections of twice said length arranged in alignment on the edges of the said plates facing one another, the said projections projecting beyond the plane of the said plate shaped holders and intermeshing with one another gear teeth-fashion along the welding line with an insulating gap left free between adjacent projections, the said projections serving all as weld electrodes and those of double length each serving as a twin electrode for two adjacent double spot welding stretches.

3. A welding appliance for simultaneously effecting a series of spot welds according to the double spot method comprising in combination: an annular core transformer having a casing split into two halves, serving as the secondary conductor thereof, two plate shaped electrode holders arranged side by side substantially in a common plane, each of the said electrode holders being mechanically and electrically connected with one half of the said split casing and insulated from the other half thereof, the said electrode holders being attached to butt faces of the said casing and extending across the insulating gap between the two halves thereof, each holder being insulated from the opposite half of the casing by suitable shape of its underside, at least one pair of electrodes integral with each of the said electrode holders projecting from the common plane thereof and intermeshing with one another gear teeth-fashion along the welding line leaving an insulating gap free between them.

4. A welding appliance as claimed in claim 3 wherein the underside of each of the said plate shaped electrode holders is stepped so as to be attached to the butt face of its associated half of the said transformer casing while leaving an insulating gap between the part projecting over the other half of said casing and the butt face thereof.

KUNO EISENBURGER.

References Cited in the file of this patent

UNITED STATES PATENTS

| Number | Name | Date |
|---|---|---|
| 1,103,041 | Eulda | July 14, 1914 |
| 1,581,868 | Reed | Apr. 20, 1926 |
| 1,878,760 | Cosgrove | Sept. 20, 1932 |
| 1,996,901 | Burns | Apr. 9, 1935 |
| 2,033,616 | Fassler | Mar. 10, 1936 |
| 2,588,062 | Vorderstrasse | Mar. 4, 1952 |